United States Patent [19]

Iizuka

[11] 3,953,130

[45] Apr. 27, 1976

[54] AUTOMATIC DIGITAL INDICATING LENS METER

[75] Inventor: Tadashi Iizuka, Machida, Japan

[73] Assignees: Kabushiki Kaisha Hoya Lens; Kabushiki Kaisha Sokkisha, both of Tokyo, Japan

[22] Filed: June 12, 1974

[21] Appl. No.: 478,883

[52] U.S. Cl. .................................. 356/125; 351/13
[51] Int. Cl.² ........................................... G01B 9/00
[58] Field of Search .......... 356/124, 125, 121, 122, 356/123; 250/201; 351/6, 13, 16; 354/25

[56] References Cited
UNITED STATES PATENTS

| | | | |
|---|---|---|---|
| 1,608,725 | 11/1926 | Currier et al. | 356/125 |
| 3,663,098 | 5/1972 | Merchant | 250/201 |
| 3,824,005 | 7/1974 | Woestman | 351/13 |

OTHER PUBLICATIONS

Bruder, Jos. A., "Instrumentation for Mapping Light Intensity Contours," IEEE Trans. on Vehicular Tech., Aug. 1970.

*Primary Examiner*—John K. Corbin
*Assistant Examiner*—Conrad Clark
*Attorney, Agent, or Firm*—Cushman, Darby & Cushman

[57] ABSTRACT

An automatic digital indicating lens meter is provided with an optical system having a light beam source and a target which reciprocally moves within a certain range along the optical axis, the target having several circular luminous points. An image pickup system including a lens to be inspected, such as a mono-focal point spherical lens or a bi-focal non-spherical point lens, is fixed on the optical axis approximately mating with the luminous centers of a light beam source collimator and a light beam receiving collimator. A photo electric converter is located at the focal plane of the receiving collimator; on an extension of said optical axis. An electric circuit analyses by scanning lines, the images detected by said electric light converter as time series signals and counts the position when the time band width of the brightness signal becomes minimum in the course of movement of the target. A further electric circuit, including a pulse motor for reciprocally driving said target through a desired diopter plus and minus range, and a signal generator for driving said motor is provided, said circuit automatically controlling said reciprocal driving of the target by synchronizing with said first mentioned electric circuit. An indicating circuit is utilized for discriminating plus or minus diopter indicating signals converted from the position, or positions, where said target image becomes of minimum area and also for digitally indicating the diopters.

6 Claims, 8 Drawing Figures a=b (WHEN IN CIRCLE)

AUTOMATIC DIGITAL INDICATING LENS METER

BACKGROUND OF THE INVENTION

1. Field of the Invention

This invention relates to a lens meter measuring a focal length of the lens, and is especially adapted to provide digital indications for non-spherical lens having two focal points, such as a lens for astigmation.

2. Description of the Prior Art

Commonly diopter D is employed to indicate refraction of the lenses for glasses by way of the reciprocal of the focal length F, according to the equation $D=1000/F$. The focal lengths of lenses for glasses are usually indicated in diopter values of plus or minus.

In conventional lens meters, relative positions within an optical system along the optical axis are changed, and by varying the distance of the light beam source to change the focal plane of the corona image, the optician observes the focal position by naked eyes or an eye inspection device to determine the focal length according to the relative relationships in distance between the of the corona images and light emitting system. However, such visual device provides an observational error in the determination of the focal positions due to the individual conditions, and thus accuracy of the measuring is not satisfactory. In such conventional devices, it is particularly difficult to sense and read each focal plane of a lens having two focal points using corona images to determine the exact focal distance of the objective lens to be checked.

SUMMARY OF THE INVENTION

The lens meter according to this invention is provided with an optical system in which there is a reciprocally moving target having several circular luminous points. The target reciprocates within a certain range along the optical axis of the system. An image pickup system including an objective lens to be inspected, such as a mono-focal point spherical lens or a bi-focal non-spherical point lens, is fixed on the optical axis approximately mating with the luminous center of a light beam source collimator a light beam receiving collimator and a photo-electric converter located at the focal plane on an extension of said optical axis. An electric circuit analyses by scanning lines, the images detected by said electric light converter as time series signals and counts the position when the time band width of the brightness signal becomes minimum in the cause of movement of the target. A further electric circuit including a pulse motor for reciprocally driving said target through a desired diopter plus and minus range and a signal generator for driving said motor is provided, said circuit automatically controlling said reciprocal driving of the target by synchronizing with said first mentioned electric circuit. An indicating circuit is utilized for discriminating plus or minus diopter indicating signals converted from the position, or positions, where said target image becomes of minimum area and also for digitally indicating the diopters.

According to the above described arrangement of this invention, the focal position is automatically measured and digitally indicated to overcome the drawbacks and disadvantages of conventional devices.

In this invention to determine the diopter of the lens, variations of the area of target corona images at each position according to the disposition of the target along the optical axis are detected by an electric light beam convertor, the brightness portion of said image being analysed according to time band width signals so that the minimum area of the corona image is determined. The objective lens to be inspected is fixed within an optical system and on one side of the lens a target having circular luminous points is reciprocally driven within a predetermined range of a stroke having predemined diopter marks. The positions where the corona image becomes of minimum square area, are determined according to the counted values of the time series signals. Diopter is digitally indicated on the indicator which discriminates plus or minus of the diopter. Therefore objective lens are automatically, swiftly and accurately measured, including the diopters of various spherical lenses and trick lenses having bi-focal points.

BRIEF DESCRIPTION OF THE ACCOMPANYING DRAWING

A preferred embodiment of this invention will be now described with reference to the accompanying drawings.

FIG. 1 shows a side view of the preferred embodiment of this invention, wherein there is provided a visual observing device for observing the position where the corona image area becomes minimum. The device is provided with diopter marks so that it is also possible to permit a direct reading of the diopter by eye observation.

Figure 1:
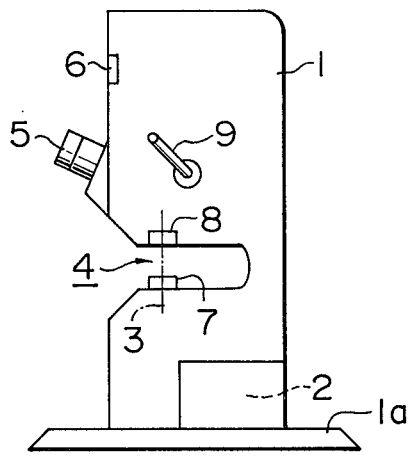
FIG. 1 is a side view of the preferred embodiment of this invention.

A main body 1 is securely mounted on the base 1a, and a light beam source 2 is contained within the lower portion of said main body 1. The optical axis 3 of the light beam is directed upwardly. A mounting location 4 for the objective lens, and eye contact member 5 of the observing device, and a diopter indicating member 6 are provided on the front surface of the device.

Since the main body 1 is vertical and the objective lens is set in a horizontal plane, even if the objective lens is a soft member, such as a contact lens, there is no distortion caused by setting due to its own weight. The diopter is free of mounting error caused by non-coincidence of optical center of the beam and the optical axis of the objective lens, the optical center is enough only to be approximately coincided with the optical axis of the lens.

Below and above the mounting location 4, lenses 7 and 8 are provided. These lenses are respectively, of a collimator on the side of the light beam source and a collimator on the light beam receiving side. An objective lens is set in a horizontal plane above which is provided a conventional marking handle 9 marking the center of the light beam onto the lens.

Figure 2:
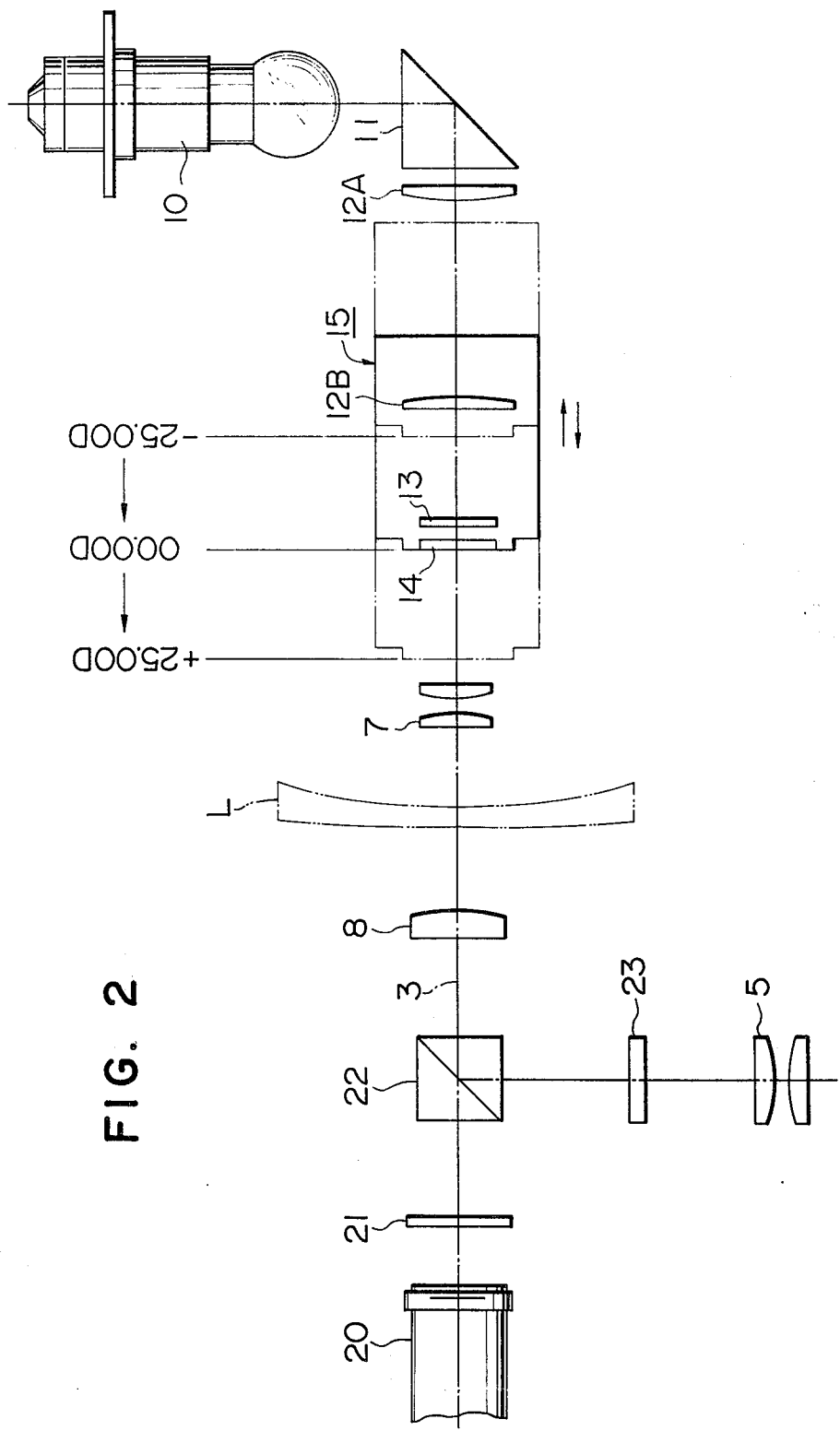
FIG. 2 is an explanatory drawing of the optical system.

In the light beam source 2, the optical system shown in FIG. 2 is contained. The optical axis 3 of the light beam source, lamp 10, is reflected by the right angle prism 11 upwardly via beam collecting lens 12A and is projected onto movable member 15 which includes a target having several circular luminous points whereby the circular luminous points are received by the collimater 8 on the receiving side of the objective lens L as a parallel beam light from the collimator 7 on the light source side.

The movable member 15 comprises a beam collecting lens 12B, a frosted glass 13 and a target 14 which is movable vertically, as shown by the arrowheads in FIG. 2, so that the target 14 can move in a given direction within the range of 0±25 diopters.

The light beam passes through the objective lens L to be inspected. The lens is fixedly set within the mounting location 4. The beam is received by the collimator 8 on the receiving side wherein the cross sectional area of the corona image of the target's luminous point varies corresponding to the moved position of the target 14. With a spherical lens having a mono focal point, said area is at a minimum at the focal plane one both sides of which there is a corona shaft which causes the cross-sectional area gradually to increase. Consequently, if plus and minus diopter marks are provided for reciprocal moving of member 15 ($D=0$ being the center of the movable range of the target), the minimum area position naturally indicates the correct diopter of the focal length. In this embodiment of the invention, one can measure 0±25D within the movable range of the target.

As described above, in the mono-focal point spherical lens, when the objective lens L is fixed and a circular luminous point target 14 is moved with respect to the optical axis, its corona image at the collimator 8 on receiving side produces a minimum cross-sectional area. However in trick lenses having bi-focal point lenses, such as for astigmatism, the first and the second focal points $f_1$ and $f_2$ are provided, said corona image being focused for both $f_1$ and $f_2$.

Figure 3:
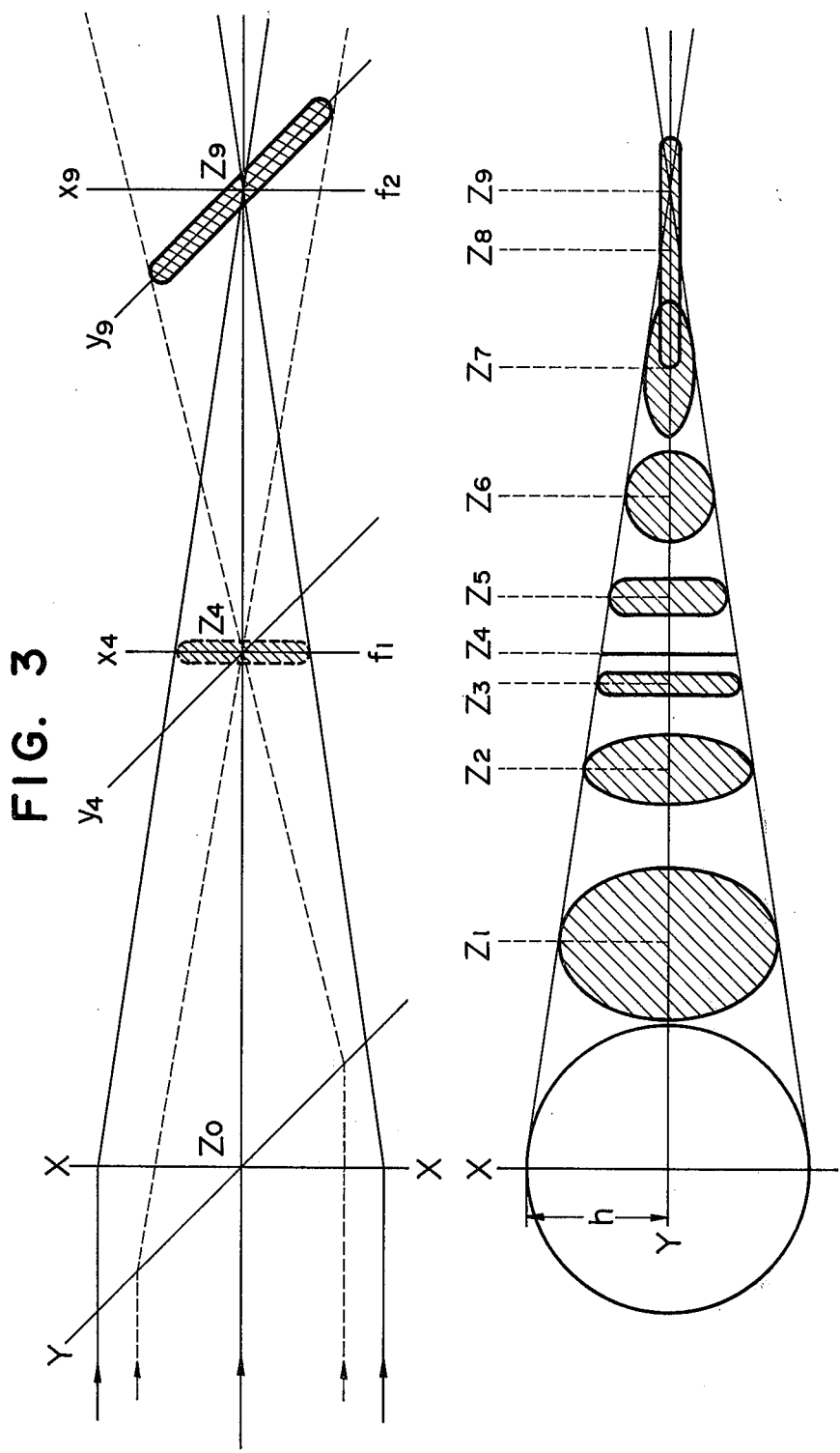
FIG. 3 is an explanatory drawing of variations of a corona image of a trick lens.

FIG. 3 shows a variation of the form and area of the corona image on the optical axis of a trick lens, wherein the direction of the optical axis is the Z axis and the corona image area at each position $Z_1 - Z_9$ along the axis is analytically shown. Where the horizontal and vertical parts are a and b respectively, the corona image area S within a range of $0 \leq Z_n$ is described by the following formula (1):

$$S = \pi a \times b$$

Figure 4:
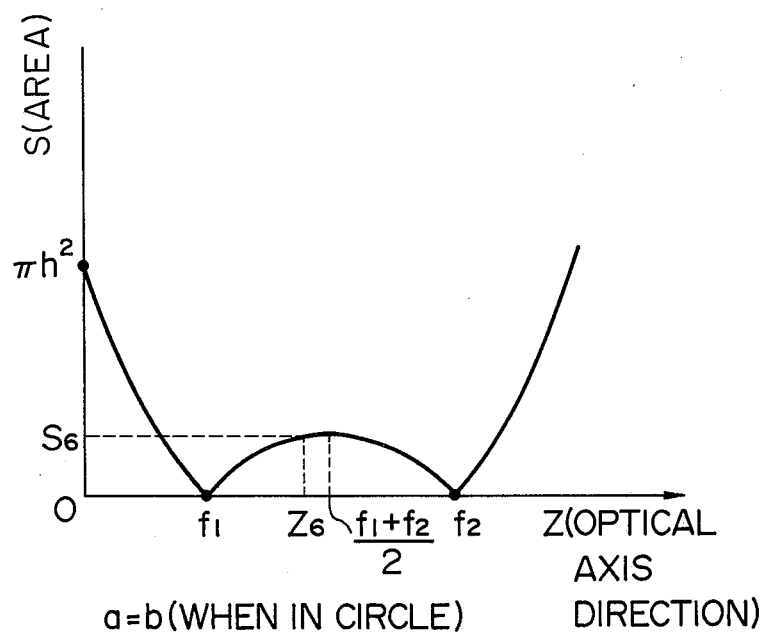
FIG. 4 is a curve illustrating distance vs area variations of the corona image.

The form and area of the corona image at each position on the Z axis varies as shown in FIG. 3, but when the area corresponding to each distance in the optical axis Z direction is calculated by formula (1) and shown in a graph, such as FIG. 4, the image is at a minimum at the positions of $Z_4$ and $Z_9$, whereby each focal length $f_1$ and $f_2$ is obtained.

The mounting member 4 shown in FIG. 1 is so arranged that various lenses L such as a mono-focal spherical lens a, non-spherical lens for astigmatism (trick lens), etc. are horizontally securely so that their luminous centers coincide approximately with the optical axis of the device.

The image pickup system comprises an electric beam light converter and a visual observing device, wherein a vidicon camera (tube), for example, is permanently located on the focal plane of the collimator 8 to receive a light beam passed through the objective lens L from the collimator 7 side. The corona image is picked up at the photo-electric surface, and its brightness portion is analysed and then converted into the time series electric signal. As will be discussed later, the time band width of each sequence is compared thereby determining the position of the minimum time band width.

In FIG. 2, a vidicon camera (tube) 20 mounted on the focal plane of the collimator 8 and a ND filter 21 are shown, said vidicon camera (tube) being located on an extension of the optical axis. The ND filter is a conventional device for eliminating the chromatic aberation caused by the elements of the optical system, including the lens being tested. The visual observing device comprises a reticle 23 made of cross lines and an eye contact member 5. A semi-transparent right angle prism 22 is located intermediate the vidicon camera (tube) 20 and the collimator 8 for receiving the light beam so as to divide and refract the optical axis at a right angle thereby introducing the corona image onto the focal mirror 23. Therefore, conventional measuring is available in a manner that the variation of form and area of the corona corresponding to the movement of the target 14 can be observed visually.

Figure 5:
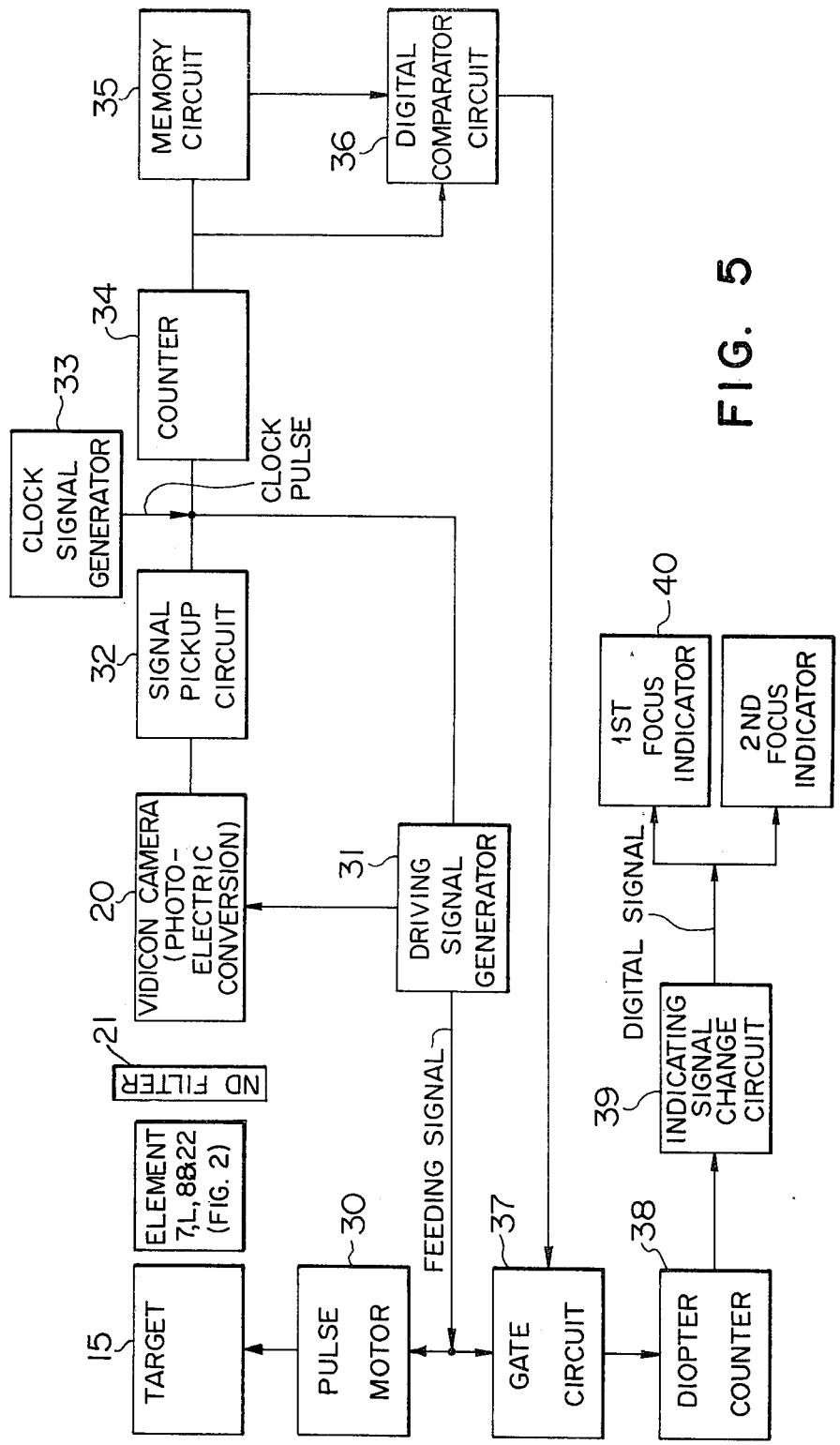
FIG. 5 is a systematical diagram showing a digital indicating device for converting said corona image into an electric signal and digitally indicating focal position.

FIG. 5 shows a system wherein electric signals representative of the corona image, obtained from the vidicon camera (tube) 20 of the photo-electric converter, are converted into digital signals representative of the diopter. The system comprises a circuit for driving the movable member 15 in the optical system, a circuit for converting the sensed corona image from the optical system into time series electric signals and for counting the time positions of the diopter, and a digital indicating signal circuit.

The movable member 15 reciprocates within a range of ±25D, from one end +25D via $D=0$ to the other end − 25D, by means of a pulse motor 30. Signals of the driving signal generator 31 are synchronized with the signals developed by the vidicon camera (tube) 20 thereby causing the movable member 15 to move by one step for each field at a constant speed.

In a mono-focal spherical lens, focal positions within the strokes of the reciprocating member 15 coincide, while in a slight diopter trick lens, since corona image area variation around the centre of $f_1$ and $f_2$ is likely flat as seen in FIG. 4, the position signal of the first focal point is picked up in the stroke of member 15 in one direction and the position signal of the second focal point is picked up in the stroke of member 15 in the reverse direction. The frequency of the signals of the signal generator 31 for driving the pulse motor 30 is synchronized with the frequency of the field feeding signals of the vidicon 20 thereby permitting the movable member 15 to reciprocate through 10 seconds within the whole stroke of 40mm of the diopter ±25D.

As described above, the incident light beam passes through the collimator 8 to produce corona image area on the photo-electric surface of the vidicon camera 20, said corona image area varying corresponding to the changing position of the target 14 as shown in FIG. 3 and becoming a minimum area at the focal plane of the objective lens L.

Figure 6:
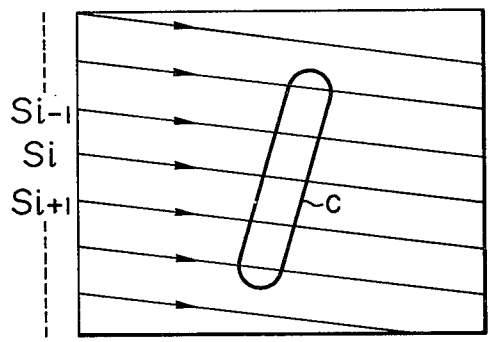
FIG. 6 is an explanatory drawing of scanning the corona image of a trick lens by the electric beam of a Vidicon camera.

The corona image on the photo-electric surface provides a static image at each step of the target 14, said static image being analysed in each field by 525 horizontal scanning lines. The brightness portion of the corona image is converted into electric signals having time band widths corresponding to the respective areas of the brightness. As shown in FIG. 6 the corona image $c$ portion has brightness, while other portions have no light signals. The output signals at the $i$-th scanning line $si$ produce a wave form shown in FIG. 7 thereby supplying an output signal V for the time band width $ti$. After reforming the wave form according to a trigger level $Vt$ at an average time band width so as to eliminate any influence of the residual image and noise, a time band width $Cni$ representative of the brightness portion can be developed by a clock signal wherein $Cni=ti/tc$ where the time band width of said clock signal pulse is $tc$.

Since the time band width of the brightness signal can be determined by a known clock signal, each corona image area at each field is quantitized by the time band width of the brightness signal as above, and the areas of each corona image at each position are compared as each field is intermittently moved at a constant speed.

Figure 7:
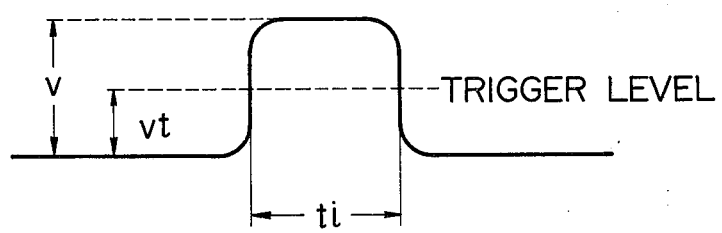
FIG. 7 is a wave form of the output signal of the Vidicon camera.
Figure 8:
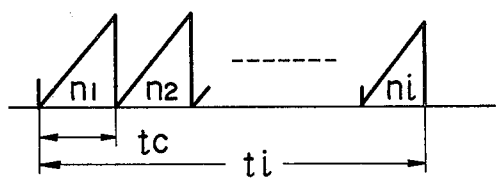
FIG. 8 is an explanatory diagram of counting the time width of the shape in FIG. 7.

In FIG. 5, the field feeding signal and the scanning line of the vidicon control camera synchronize with a driving signal generator 31, wherein the brightness signal output is reformed at a trigger level $Vt$ shown in FIG. 7 by means of a signal pickup circuit 32. The number of pulses from a clock signal generator 33 is counted by means of a counter 34 corresponding to the time band widths of the brightness signals and are stored one by one in a memory circuit 35. Each corona image area at each field is compared as an equivalent time pattern with those previous and subsequent to said area by means of a digital comparator circuit 36, a signal at a particular time corresponding to the minimum area being supplied to a gate circuit 37.

The gate circuit 37 receiving pulses from the driving signal generator 31 of the pulse motor 30 closes and opens by receiving signals from the digital comparator circuit 36 and supplies signals to the diopter counter circuit 38. Said signals are then supplied to the diopter indicator 6 (FIG. 1) via a signal indicating change circuit 39 thereby indicating digital diopter of the first focal point on corona indicator 40 of said indicator 6. In counter circuit 38 data-counting of plus and minus diopters and discrimination of the first and second coronas is accomplished, wherein when a second minimum corona area is detected, a signal corresponding to the second focal point is indicated on the second corona indicator 41 as a digital diopter. With a monofocal lens, both diopters coincide.

The moving speed of the target is constant and its position when the gate circuit 37 opens is determined by the speed and the moving time. Consequently, a position where the corona image is of a minimum area can be counted by the number of pulses from the driving signal generator for step-moving the target, whereby when a distance of one step is converted into a diopter unit, the diopter at the focal position can be digitally indicated.

As indicated above, the movable member 15 carrying the target 14 reciprocally moves from the one end to another end of its predetermined stroke. However, said member 15 can be automatically stopped at any moment by means of a control circuit (not shown) and returned to the beginning end.

The above measuring method has the advantage of counting the focal plane position very accurately.

According to the present embodiment of this invention, the diopter digital indication can be indicated as plus or minus in 4 units and a minumum of 0.125D can be readable.

According to this invention diopter can be read automatically within several second by merely mounting various forms of lenses having spherical and non spherical surfaces to the device and the data can be digitally indicated. By utilizing such a lens mounting member as described, various objective lenses, even if they are soft, can be very accurately measured as same as the hard lenses. By sensing changes in the corona images of the luminous point, exact focal points can be detected according to the conditions of the corona images and the variation curves of their areas. Therefore, an exact reading of focal point can be accomplished even with lenses having an unexact focal point, especially astigmatism lenses having bi-focal points wherein their characteristic curves on opposite sides of the focal points are flat.

I claim:

1. An automatic lens meter for digitally indicating the diopter of a lens, comprising:
   an optical system which includes means for projecting a beam of light along an optical axis, a target having at least one circular luminous point and adapted to be moved reciprocally along said axis within a predetermined range, a spaced pair of collimators positioned along said axis, and means for mounting said lens intermediate the collimators substantially on said optical axis;
   an image pickup system positioned on an extension of said optical axis, said pickup system including a vidicon camera having a photo-electric surface upon which an image from said circular luminous point is directed by said optical system whereby the vidicon camera converts the image into electrical signals in accordance with the area of said image on the photo-electric surface;
   a motor connected to said target; and
   circuit means for energizing said motor to reciprocate the target and for responding to the electrical signals to provide a digital indication of the diopter of said lens as a function of the minimum area of said image.

2. A lens meter according to claim 1, wherein each of said electrical signals has a time band width proportional to the area of the image converted by said vidicon camera and wherein said circuit means includes:
   a clock signal generator;
   means for counting the number of pulses produced by said generator during the time band width of each of said electrical signals;
   a memory circuit for storing counts developed by said counting means; and
   comparator means for comparing said counts.

3. A lens meter according to claim 1, wherein said circuit means further comprises:
   means for synchronizing the conversion performed by said vidicon camera with the energization of said motor.

4. A lens meter according to claim 2, wherein said circuit means further comprises:
   means for synchronizing the conversion performed by said vidicon camera with the energization of said motor; a gate responsive to said synchronizing means and the output of said comparator; and digital indicating means responsive to the output of said gate.

5. A lens meter according to claim 4, wherein said digital indicating means includes means for displaying in terms of plus and minus diopter the position of said target with respect to a reference point within the range of reciprocal movement of said target.

6. A lens meter according to claim 1, further comprising means for simultaneously directing the image from said circular luminous point to said photo-electric surface and to an eye contact member.

* * * * *